United States Patent
Miyamoto

[11] 3,902,184
[45] Aug. 26, 1975

[54] SHUTTER RELEASE HAVING BULB EXPOSURE MECHANISM FOR AUTOMATIC SHUTTER CAMERA

[75] Inventor: Takayoshi Miyamoto, Osaka, Japan

[73] Assignee: Minolta Camera Kabushiki Kaisha, Osaka, Japan

[22] Filed: Dec. 2, 1974

[21] Appl. No.: 528,973

[30] Foreign Application Priority Data
Dec. 4, 1973 Japan.............................. 48-138371

[52] U.S. Cl. ................ 354/266; 354/133; 354/267
[51] Int. Cl.² ..................... G03B 9/58; G03B 17/38
[58] Field of Search ............ 354/48, 126, 129, 133, 354/139, 226, 266, 267

[56] References Cited
UNITED STATES PATENTS
| | | | |
|---|---|---|---|
| 3,696,727 | 10/1972 | Yokozato | 354/133 |
| 3,698,300 | 10/1972 | Kabori | 354/258 |
| 3,698,304 | 10/1972 | Tenkumo | 354/234 |

Primary Examiner—Joseph F. Peters, Jr.
Attorney, Agent, or Firm—Wolder & Gross

[57] ABSTRACT

A bulb mechanism is provided in a camera in which a shutter mechanism including an electro-magnetic control mechanism is incorporated as a block or unit. This shutter mechanism includes a rear curtain locking lever controlled by an electro-magnet and formed as a unitary element therewith. The bulb mechanism is a separate unit and comprises a bulb lever having one arm engaging the shutter release rod of the camera and a second arm having a terminal flange. When the camera is set for a bulb exposure, depression of the shutter release rod rotates the bulb lever to a position in which its terminal flange blocks the locking lever from full rotation and thus prevents the rear curtain from being released from its locked, open condition so that the shutter is not closed until the operation of the exposure mechanism is completely terminated. The bulb lever and the locking lever are so disposed that their respective axes of rotation are at right angles to each other, so that manufacturing errors in positioning the levers will not adversely affect the accuracy of the exposure.

7 Claims, 5 Drawing Figures

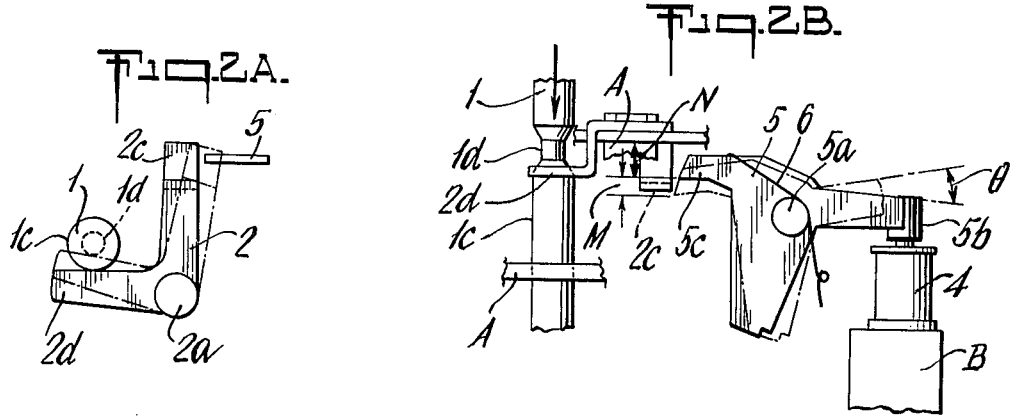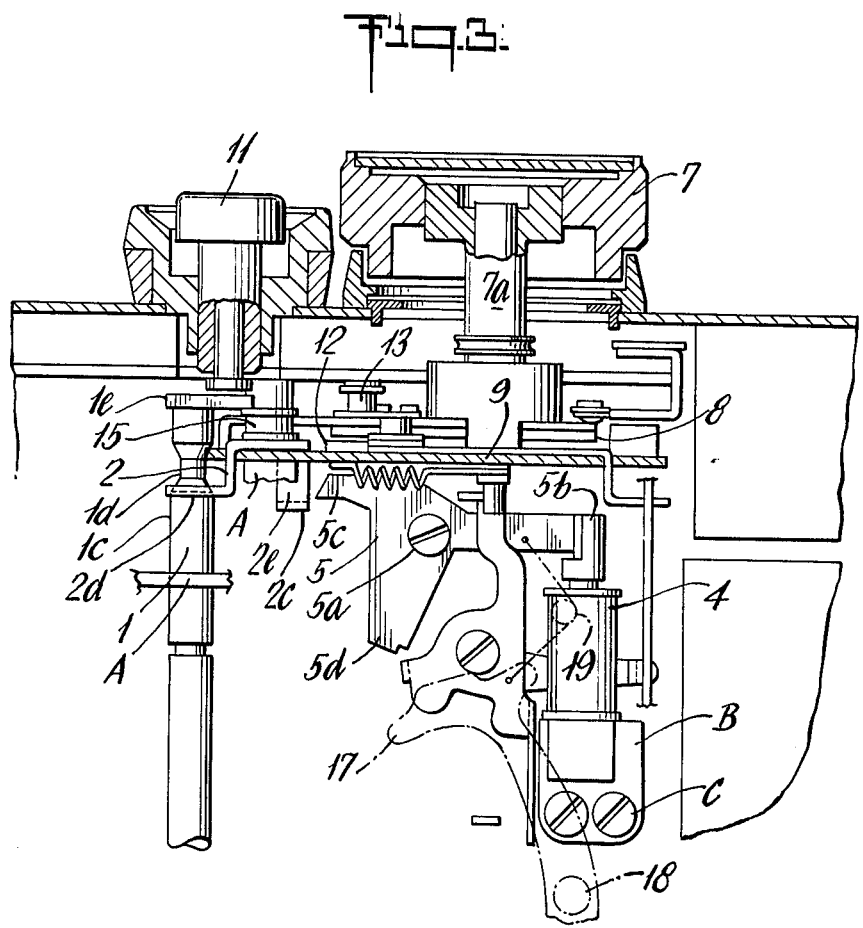

SHUTTER RELEASE HAVING BULB EXPOSURE MECHANISM FOR AUTOMATIC SHUTTER CAMERA

BACKGROUND OF THE INVENTION

The present invention relates to a bulb mechanism for use with an electrically-operated camera shutter and, more particularly, to a bulb mechanism for a camera in which the shutter mechanism, including front and rear shutter curtains and electro-magnetic control mechanism, is incorporated as a block or unit.

Considerable advantages result from a shutter mechanism incorporating as a built-in block or unit shutter curtains, shutter actuating mechanism, an electromagnet and a rear curtain locking member provided with an armature cooperating with the electromagnet for controlling shutter closing. One such advantage is that the camera body and shutter mechanism may be assembled independently.

However, in the case of bulb photographing with a camera in which the aforesaid electromagnet and shutter mechanism are built-in integrally in the camera body, the rear shutter curtain is not controlled only by the mechanism arranged within the shutter block. Thus, when a shutter dial on the camera body is set for bulb photographing, it is imperative that the bulb member be actuated in association with the operation of the shutter release member to thereby stop the operation of the locking member on the side of the electric shutter, so that the release operation of the rear curtain from its locked condition will be maintained until the termination of the operation of the shutter release member.

Camera which include shutter mechanisms incorporated as a block or unit are known in the prior art. However, such cameras have no bulb mechanism of the type disclosed in the instant application. Bulb mechanism of this general type is shown in U.S. Pat. Nos. 3,698,300 and 3,698,304, both assigned to the assignee of this application. If the bulb mechanism shown in these patents were to be employed, with their structures unchanged, in a camera having a shutter mechanism constructed as a block or integral unit, considerable difficulty would arise in properly mounting the pivot shafts in precise parallel alignment. Inevitable errors in manufacturing would result in misalignment of the shafts, thus producing improper exposure when the camera is used for bulb photography. Such misalignment could be corrected by providing means for individually adjusting the positions of the parts after the mechanism has been assembled in the camera, but such adjustment would involve an unduly burdensome and costly manufacturing procedure.

It is, accordingly, an object of the present invention to provide a bulb mechanism for use with an electrically operated camera shutter, which mechanism may be assembled as a unit in a simple manner within the camera without need for adjustment, even if manufacturing errors result in misalignment of the electric shutter block with the camera body.

Another object of the invention is the provision of a bulb mechanism which permits positive bulb photographing by stopping the rotation of a locking lever before the shutter rear curtain is released from its locked position during the shutter release operation.

Still another object of this invention is the provision of a bulb mechanism of the character described which includes shutter mechanism having an electromagnetic control which may be incorporated as a block or unit within the camera for ease of assembly.

A further object of the invention is the provision of a bulb mechanism of the character described which includes a bulb member and a retaining member rotatably mounted on respective axes which are substantially at right angles to each other, thereby insuring proper interconnetion between the shutter release member and the retaining member.

SUMMARY OF THE INVENTION

In accordance with the invention, there is provided a bulb mechanism for a camera in which an electromagnetic shutter control mechanism is incorporated as an integral block or unit. The mechanism operates in combination with a shutter release member which is manually movable from a rest position to an operative, shutter-release position, and includes a retaining member rotatable about a first axis from a first position in which it retains a shutter closing member, to a second position in which it actuates said shutter closing member. The mechanism also includes a bulb member rotatable about a second axis in response to movement of the shutter release member in such manner that when the shutter release member is transferred to its operative position, the bulb member is moved to a position in which it prevents rotation of the retaining member to its second position, and when the shutter release member returns from its operative position to its rest position, the bulb member withdraws from the position of restraining rotation of the retaining member. The bulb member and retaining member are so arranged that said first axis and second axis are substantially at right angles with each other.

BRIEF DESCRIPTION OF THE DRAWINGS

Additional objects and advantages of the invention will become apparent during the course of the following specification when taken in connection with the accompanying drawings, in which:

FIGS. 2A and 2B are, respectively, top plan and elevational views of the basic components of a bulb mechanism made in accordance with the present invention;

FIG. 3 is a side elevational view of a portion of the interior of a camera showing the basic components of FIGS. 2A and 2B incorporated therein, with portions thereof broken away and shown in section.

Figure 1:
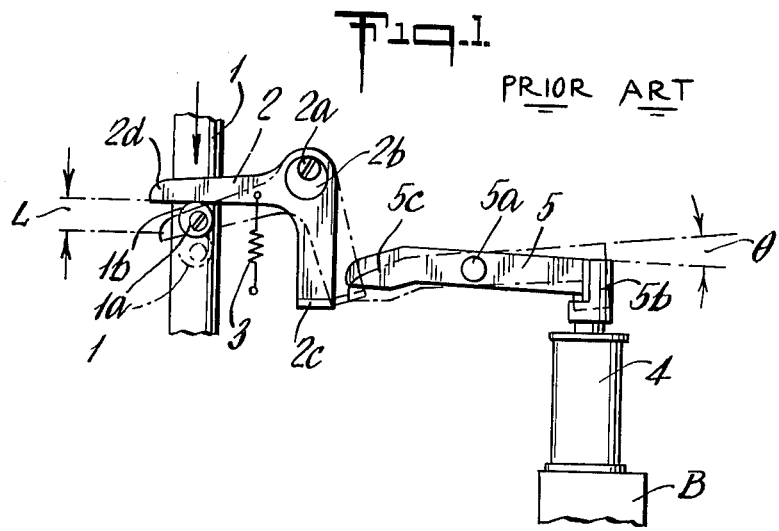
FIG. 1 is an elevational partial view of the basic components of the bulb mechanism of an electric shutter of conventional type.

Referring in detail to the drawings, there is shown schematically in FIG. 1 a bulb mechanism known in the prior art, in which an attempt has been made to combine such bulb mechanism with an electric shutter of conventional type. This conventional mechanism includes a shutter release member 1 located on the side of a camera body and having a manipulating pin 1a projecting therefrom. Adjacent the release member 1, a bulb member 2 is rotatably journalled on a shaft 2a with one arm 2d thereof engaging the projecting manipulating pin 1a. The bulb member 2 is biased by a spring 3 for rotation in a counterclockwise direction, so as to follow the manipulating pin 1a when the shutter dial is set for bulb photographing. The other arm of bulb member 2 is provided with a terminal engaging flange 2c.

As a separate assembly, in a block B on the side of an electric shutter, a locking lever 5 is rotatably journalled on a shaft 5a and is biased by a spring (not shown) for rotation in a counterclockwise direction. The locking lever 5 is so arranged that its counterclockwise rotation will cause it to release the rear curtain of the shutter from a locked condition. One arm of the locking lever 5 carries an armature 5b which cooperates with an electromagnet 4.

The bulb member 2 and locking lever 5 are assembled within the camera in such a manner that the shafts 2a and 5a are disposed parallel to each other. Thus, the engaging or arresting flange 2c of the bulb member 2, which is adapted to rotate in association with depression of the shutter release member 1, engages arm 5c of locking lever 5 before the latter releases the rear curtain from its locked condition, thereby stopping rotation of the lever 5 and thus maintaining the shutter in open condition. The shutter remains open until termination of operation on the shutter release member 1, at which time the locking lever 5 is permitted to rotate in a counterclockwise direction to thereby release the rear curtain from the locked condition, in a manner to be described hereinafter.

Because of the requirement for a precise parallel relationship of the shafts 2a and 5a, when the two structures of FIG. 1 are assembled in a camera body, if manufacturing errors result in even a slight difference in position between the shaft 2a and the shaft 5a, the arrested position of the arm 5c, by means of the arresting flange 2c, will vary to a considerable extent. In other words, the intersection of the rotational locus of the arresting flange 2c with that of the arm 5c will vary to a great extent from camera to camera, due to errors in precisely positioning the aforesaid shafts.

Nevertheless, when the shutter release member 1 is moved in the shutter release operation, it moves through the stroke L, shown between the broken lines in FIG. 1. When the stroke L is increased, this causes movement of a camera, which results in blur of the picture image, at the time of photographing. Thus, the length of the stroke L should be minimized. In addition, it will be seen in FIG. 1 that where electrical control of exposure time is utilized, the locking lever 5 turns through a rotational angle $\theta$ in response to armature 5b being attracted to electromagnet 4 or being released from its attracted position. If this angle $\theta$ is increased due to imperfect parallel alignment of the shafts 2a and 5a, then an increased delay results in the release of the shutter rear curtain from its locked condition by counterclockwise rotation of the locking lever 5, with corresponding errors in exposure. For this reason, the rotational angle $\theta$ should be maintained at a minimum.

It will thus be apparent that the mere built-in arrangement of an electric shutter in a camera body will not result in satisfactory bulb photographing because of the aforementioned manufacturing inaccuracies. To compensate for such inaccuracies, an eccentric tube may be fitted upon the manipulating pin 1a of shutter release member 1, and an eccentric tube 2h can be mounted between the shaft 2a and the shaft-receiving hole in the bulb member 2. Thus, by varying the eccentricities of both tubes, they may be adjusted so as to permit bulb photographing. Such arrangement is obviously time consuming and difficult.

The aforementioned difficulties are overcome by the structure of the present invention in which the aforementioned shafts extend substantially at right angles to each other rather than being disposed in parallel relationship.

FIGS. 2A and 2B show schematically an arrangement of camera operating elements made in accordance with the invention herein. The shutter release member 1 is longitudinally slidable in the direction of the arrow in FIG. 2B along an extension portion A of the camera body for the shutter release operation, and the bulb member 2 rotates about shaft 2a relative to the body portion A to follow the sliding movement of the shutter release member 1. The sliding position of shutter release member 1 and the rotating position of the bulb member 2 do not vary because of the process of die casting used in forming these positions, so that there is little error in the relative positioning of the members.

The shutter release member 1 is formed with a cylindrical portion 1c of large diameter extending longitudinally in the direction of sliding movement, and an intermediate portion 1d of smaller diameter. Arm 2d of bulb member 2 engages the surface of release member 1 in the manner shown in FIG. 2A under biasing action of a spring (not shown). The other arm of bulb member 2 terminates in a bent portion 2e extending parallel to the rotatable shaft 2a, which bent portion 2e is formed with an arresting piece 2c.

As a separate assembly in the shutter block B, the locking lever 5 is rotatably journalled on a shaft 5a extending in a direction at right angles to the rotatable shaft 2a. An armature 5b, carried by one arm of the locking lever 5, cooperates with electromagnet 4. The locking lever 5 is rotated in a counterclockwise direction as viewed in FIG. 2B, by means of a spring 6, when the armature 5b is released from its attracted position within the electromagnet 4. In this respect, when the locking lever 5 is rotated through an angle of $\theta$, the rear curtain is released from locked condition. The end of the other arm 5c of locking lever 5 is arrested by arresting piece 2c before the bulb member 2 is rotated through the angle $\theta$ in the clockwise direction as viewed in FIG. 2A.

In other words, the bulb member 2 is adapted to lock the locking lever 5 within the moving range M of the end of arm 5c of locking lever 5 within the rotating angle of $\theta$, through the entire extent of which the rear curtain would be released from its locked condition by means of the locking lever 5. With the aforesaid arrangement, however, even if there is variation in the extent of rotation of the bulb member 2, there will be no variation in the rotating angle of the locking lever 5, i.e., in the moving extent of the end of arm 5c, insofar as the arresting piece 2c engages the locking member 5, because the rotatable shaft 5a of locking lever 5 is directed at a right angle to the axis of the rotatable shaft 2a of bulb member 2. As a result, errors in the moving extent M are only affected by the errors in the length N as shown in FIG. 2B.

Figure 4:
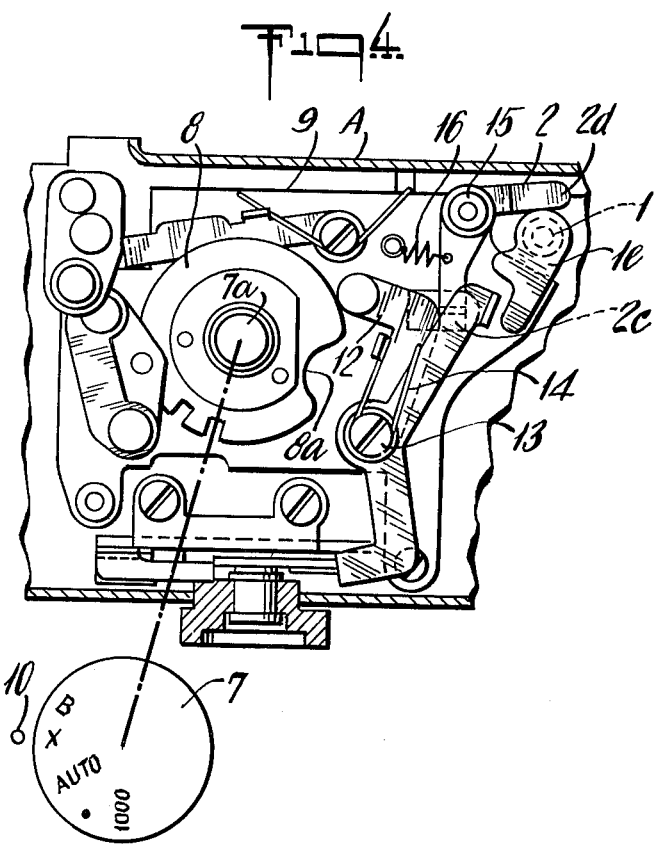
FIG. 4 is a top plan view of the portion of the interior of the camera shown in FIG. 3.

FIGS. 3 and 4 illustrate the manner in which the embodiment of FIGS. 2A and 2B are incorporated in the body of a camera to cooperate with the external mechanism thereof. As shown in FIG. 3, the shutter block B is assembled to the camera body A by means of screws C.

The camera has a shutter dial 7 rotatably mounted exteriorly of the camera body A on a rotatable shaft 7A, upon which is also mounted a cam plate 8 of the bulb mechanism. The shaft 7a is journalled in a shutter dial mounting plate 9. Formed on the top surface of the dial 7 are various types of shutter control indicia, including bulb photographing indicia "B", as shown in FIG. 4, so that the shutter is controlled by setting one of the indicia to an index 10.

A bulb interlocking lever 12 is rotatably journalled on a shaft 13 which is anchored in the shutter dial mounting plate 9, and is biased by spring 14 so as to rotate in the counterclockwise direction. A pin 12a formed on the bulb interlocking lever 12 is normally in contact with the cam plate 8 which is formed with a concave recess 8a, so that when the bulb indicia "B" is set to the index 10, the pin 12a is received in the concave recess 8a, so that the bulb interlocking lever 12 rotates in the counterclockwise direction, as viewed in FIG. 4, under action of spring 14.

The bulb member 2 is rotatably journalled on a shaft 15 corresponding to shaft 2a in FIGS. 2A and 2B, which rigidly mounts the shutter dial mounting plate 9 on the camera body A and is biased by a spring 16 so as to rotate in a clockwise direction. The bulb member 2 is formed with an arm 2d which engages the side surface of the shutter release rod 1 in a manner to be presently described. The bulb member 2, as previously described, has an arresting piece 2c formed at the end of a bent portion 2e, which arresting piece 2c blocks rotational movement of the locking member 5 by engaging the end of arm 5c of the locking member 5, as shown in FIG. 3. In addition, the bulb member 2 engages the bulb interlocking lever 12 in such a manner that the bulb member 2 is released from an inoperative position, out of engagement with the shutter release member 1, when the bulb interlocking lever 12 is rotated in a counterclockwise direction by entrance of the pin 12a within concave recess 8 a.

The shutter release rod 1 is slidable in a vertical direction along the extension portion A of the camera body and is biased to move upwardly by means of a spring (not shown). The shutter release rod 1 has a section 1c of large diameter with which the arm 2d of bulb member 2 makes abutting engagement, and a small diameter portion 1d. The top end face 1e of the shutter release rod 1 is engaged by a release button 11.

The locking member 5 in the shutter block B is associated with an electromagnet 4 adapted to be energized by the output of an electric control circuit to actuate the armature 5b facing the magnetic pole of electromagnet 4. The locking member 5 has an arm end 5c engageable with the arresting piece 2c, and a locking portion 5d adapted to lock the shutter rear curtain against movement. The locking member 5 is rotatably journalled on a shaft 5a which extends substantially at a right angle to the shaft 15. A control lever 17 is rotatably journalled in the shutter block B by means of a shaft 18, and is loaded so as to rotate in a clockwise direction by means of a spring (not shown). The control lever 17 is coupled to the locking lever 5 by a kick spring 19 which is secured at its ends to both the control lever 17 and locking lever 5. Thus, when the control lever 17 is rotated in the clockwise direction, the locking member 5 is also rotated in a clockwise direction by the kick spring 19.

Accordingly, when the shutter dial 7 is not set for bulb photographing, the bulb interlocking lever 12 is rotated in a counterclockwise direction by means of cam plate 8 and hence arrested in position, as shown in FIG. 4. Thus, even if the arm 2d of bulb member 2 registers with the small diameter portion 1d of shutter release lever 1 during the release operation, the clockwise rotation of the bulb member 2 is stopped, and the arresting piece 2c remains out of the rotational path of the arm end 5c of locking lever 5, so that the rotation of the locking lever 5 is controlled by means of electromagnet 4. Then, when the locking lever 5 is rotated through an angle of $\theta$, the rear curtain is released from its locked condition.

On the other hand, when the shutter dial 7 is set to the bulb position "B", the pin 12a is received in the concave recess 8a of the cam plate 8 and the bulb interlocking lever 12 is rotated in a counterclockwise direction, so that the bulb member 2 is rotated in a clockwise direction and is released from its locked condition into engagement with the shutter release member 1. Accordingly, when the shutter release rod 1 is depressed during the release operation, the arm 2d slides along the large diameter portion 1c of release member 1 and engages the small diameter portion 1d, so that the bulb member 2 rotates in the clockwise direction, while the arresting piece 2c remains within the rotational path of the arm end 5c of the locking lever 5. Accordingly, when the shutter is released and control lever 17 is rotated in the counterclockwise direction, the locking lever 5 is also rotated in a clockwise direction instantaneously by means of the kick spring 19. However, prior to rotation of locking lever 5 through the complete angle $\theta$, the arm end 5c remains engaged with the arresting piece 2c to thereby stop the aforesaid rotation. When the release button 11 is stopped from further depression, the aforesaid engagement is released, thus terminating the bulb photographing.

With the arrangement described above, since the shafts 15 and 5a are disposed at right angles to each other, even if minor manufacturing errors should cause misalignment in the engaging position of arm end 5c with the arresting piece 2c, the camera exposure will not be adversely affected. Such misalignment will remain within the difference in distance between the position of the shaft 15 of bulb member 2 and the position of the shaft 5a of locking lever 5, so that a major error in the rotational angle of the locking lever 5 will not occur. The arrangement thus permits positive bulb photographing with an electric shutter assembly without the necessity for adjusting the position of the parts upon assembly.

While a preferred embodiment of the invention has been shown and described herein, it is obvious that numerous omissions, changes and additions may be made in such embodiment without departing from the spirit and scope of the invention. What is claimed is:

1. A shutter assembly for a camera having a shutter release member movable between a rest position and an operative position, said shutter assembly comprising in combination:

electro-magnetically controlled shutter mechanism comprising, as a unitary element, an electromagnet and a shutter locking lever having an armature cooperating with said electromagnet;

said shutter locking lever being rotatably mounted about a first axis for movement between a first position for holding the camera shutter in open condition and a second position for causing the camera shutter to close;

and bulb mechanism including a bulb member rotatably mounted about a second axis and operatively associated with said shutter release member for rotational movement in response to movement of said shutter release member;

said bulb member being movable to a holding position in which it blocks movement of said shutter locking lever in response to movement of said shutter release lever to its operative position;

said bulb member being also movable to a release position in which it withdraws from blocking engagement with said shutter locking lever in response to movement of said shutter release lever to its rest position;

said bulb member and said shutter locking lever being so disposed that said first and second axis are substantially at right angles to each other.

2. A shutter assembly according to claim 1 in which said shutter release member is a rod mounted for longitudinal movement, and said bulb member is so disposed that said second axis is substantially parallel to the direction of longitudinal movement of said rod.

3. A shutter assembly according to claim 1 which also includes shutter speed setting means and a cam member rotatable thereby, said cam member having means for bringing said bulb member to an operative position relative to said shutter release member when said shutter speed setting means is set to a bulb exposure position.

4. A shutter assembly according to claim 3 in which said shutter speed setting member, said cam member and said bulb member are formed as a unitary subassembly.

5. A shutter assembly according to claim 1 which also includes an exposure time setting member operatively coupled with said bulb member.

6. A shutter assembly according to claim 2 in which said shutter release rod has a section of relatively large diameter engaging said bulb member in the rest position of said rod and restraining said bulb member for rotation, and a section of reduced diameter engaging said bulb member in the operative position of said rod and permitting said bulb member to rotate to its holding position.

7. A shutter assembly for a camera having a shutter release member movable between a rest position and an operative position, said shutter assembly comprising in combination:

electro-magnetically controlled shutter mechanism comprising, as a unitary element, an electromagnet and a shutter locking lever having an armature cooperating with said electromagnet;

said shutter locking lever being rotatably mounted about a first axis for movement between a first position for holding the camera shutter in open condition and a second position for causing the camera shutter to close;

and bulb mechanism including a bulb member rotatably mounted about a second axis and operatively associated with said shutter release member for rotational movement in response to movement of said shutter release member;

said bulb member being movable to a holding position in which it blocks movement of said shutter locking lever in response to movement of said shutter release lever to its operative position;

said bulb member being also movable to a release position in which it withdraws from blocking engagement with said shutter locking lever in response to movement of said shutter release lever to its rest position; and said bulb member and said shutter locking lever being so disposed that said bulb member moves in a path which crosses the path of movement of said shutter locking lever.

* * * * *